US007660234B2

(12) United States Patent
Ilan et al.

(10) Patent No.: US 7,660,234 B2
(45) Date of Patent: Feb. 9, 2010

(54) FAULT-TOLERANT MEDIUM ACCESS CONTROL (MAC) ADDRESS ASSIGNMENT IN NETWORK ELEMENTS

(75) Inventors: Shmuel Ilan, Ramat-Gan (IL); Leon Bruckman, Petah Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 532 days.

(21) Appl. No.: 11/534,556

(22) Filed: Sep. 22, 2006

(65) Prior Publication Data

US 2008/0075082 A1    Mar. 27, 2008

(51) Int. Cl.
*G01R 31/08* (2006.01)
*H04L 12/28* (2006.01)
(52) U.S. Cl. ............... 370/216; 370/389; 370/392; 370/401
(58) Field of Classification Search .............. None
See application file for complete search history.

(56) References Cited

U.S. PATENT DOCUMENTS

| | | |
|---|---|---|
| 5,159,595 A | 10/1992 | Flanagan et al. |
| 5,307,353 A | 4/1994 | Yamashita et al. |
| 5,321,393 A | 6/1994 | Carlton et al. |
| 5,461,611 A | 10/1995 | Drake et al. |
| 5,581,703 A | 12/1996 | Baugher et al. |
| 5,596,569 A | 1/1997 | Madonna et al. |
| 5,638,358 A | 6/1997 | Hagi et al. |
| 5,706,516 A | 1/1998 | Chang et al. |
| 5,925,137 A | 7/1999 | Okanoue et al. |
| 6,021,263 A | 2/2000 | Kujoory et al. |
| 6,205,488 B1 | 3/2001 | Casey et al. |
| 6,233,073 B1 | 5/2001 | Bowers et al. |
| 6,246,667 B1 | 6/2001 | Ballantine et al. |
| 6,256,292 B1 | 7/2001 | Ellis et al. |
| 6,262,976 B1 | 7/2001 | McNamara |
| 6,275,493 B1 | 8/2001 | Morris et al. |
| 6,304,575 B1 | 10/2001 | Carroll et al. |
| 6,314,110 B1 | 11/2001 | Chin et al. |
| 6,330,229 B1 | 12/2001 | Jain et al. |
| 6,339,488 B1 | 1/2002 | Beshai et al. |

(Continued)

OTHER PUBLICATIONS

Malsen, et al., "MAC-Forced Forwarding: A Method For Subscriber Separation On An Ethernet Access Network," RFC 4562, Jun. 2006.

(Continued)

*Primary Examiner*—Steven H Nguyen
(74) *Attorney, Agent, or Firm*—Darby & Darby P.C.

(57) ABSTRACT

A network element includes a backplane, which includes a backplane memory holding first medium access control (MAC) address values. The network element further includes multiple tributary modules coupled to the backplane, which include network interfaces that are configured to communicate over network trunks using MAC addresses that are respectively assigned to the network interfaces. The network element further includes a common function module (CFM), which communicates with the tributary modules and the backplane memory via the backplane, and which includes a CFM memory holding second MAC address values.

The CFM is arranged to assign the MAC addresses to the network interfaces by selecting the MAC addresses from among the first MAC address values when the CFM is able to access the backplane memory, and by selecting the MAC addresses from among the second MAC address values when the CFM is unable to access the backplane memory.

19 Claims, 2 Drawing Sheets

U.S. PATENT DOCUMENTS

| | | | |
|---|---|---|---|
| 6,339,595 B1 | 1/2002 | Rekhter et al. | |
| 6,359,858 B1 | 3/2002 | Smith et al. | |
| 6,366,556 B1 | 4/2002 | Ballintine et al. | |
| 6,370,121 B1 | 4/2002 | Hausman | |
| 6,400,681 B1 | 6/2002 | Bertin et al. | |
| 6,408,001 B1 | 6/2002 | Chuah et al. | |
| 6,442,134 B1 | 8/2002 | Mitchell | |
| 6,456,407 B1 | 9/2002 | Tammela et al. | |
| 6,456,587 B2 | 9/2002 | Taniguchi | |
| 6,466,985 B1 | 10/2002 | Goyal et al. | |
| 6,563,793 B1 | 5/2003 | Golden et al. | |
| 6,584,535 B1 | 6/2003 | Ouellet et al. | |
| 6,604,136 B1 | 8/2003 | Chang et al. | |
| 6,628,624 B1 | 9/2003 | Mahajan et al. | |
| 6,636,478 B1 | 10/2003 | Sensel et al. | |
| 6,639,893 B1 | 10/2003 | Chikenji et al. | |
| 6,639,896 B1 | 10/2003 | Goode et al. | |
| 6,647,008 B1 | 11/2003 | Galand et al. | |
| 6,678,241 B1 | 1/2004 | Gai et al. | |
| 6,680,906 B1 | 1/2004 | Nguyen | |
| 6,680,912 B1 | 1/2004 | Kalman et al. | |
| 6,711,125 B1 | 3/2004 | Walrand et al. | |
| 6,724,880 B1 | 4/2004 | Lynch | |
| 6,731,597 B1 | 5/2004 | Batchellor et al. | |
| 6,760,775 B1 | 7/2004 | Anerousis et al. | |
| 6,765,921 B1 | 7/2004 | Stacey et al. | |
| 6,778,496 B1 | 8/2004 | Meempat et al. | |
| 6,795,394 B1 | 9/2004 | Swinkels et al. | |
| 6,807,172 B1 | 10/2004 | Levenson et al. | |
| 6,820,210 B1 | 11/2004 | Daruwalla et al. | |
| 6,829,651 B1 | 12/2004 | Bass et al. | |
| 6,831,932 B1 | 12/2004 | Boyle et al. | |
| 6,879,559 B1 | 4/2005 | Blackmon et al. | |
| 6,886,043 B1 | 4/2005 | Mauger et al. | |
| 6,925,054 B1 | 8/2005 | Atterton et al. | |
| 6,928,478 B1* | 8/2005 | Gangadharan | 709/226 |
| 6,941,487 B1* | 9/2005 | Balakrishnan et al. | 370/216 |
| 6,985,447 B2 | 1/2006 | Gibson et al. | |
| 7,009,974 B1 | 3/2006 | Fotedar | |
| 7,502,840 B1* | 3/2009 | Bakke | 709/222 |
| 2001/0022786 A1 | 9/2001 | King et al. | |
| 2002/0015411 A1 | 2/2002 | Kataoka et al. | |
| 2002/0018482 A1 | 2/2002 | Gotzer | |
| 2002/0093949 A1 | 7/2002 | Yasue et al. | |
| 2002/0176450 A1 | 11/2002 | Kong et al. | |
| 2002/0179720 A1 | 12/2002 | Liva et al. | |
| 2003/0018804 A1* | 1/2003 | Laxman et al. | 709/236 |
| 2003/0026298 A1 | 2/2003 | Bisson et al. | |
| 2003/0061338 A1 | 3/2003 | Stelliga | |
| 2003/0074469 A1 | 4/2003 | Busi et al. | |
| 2003/0088698 A1 | 5/2003 | Singh et al. | |
| 2003/0147344 A1 | 8/2003 | Stewart et al. | |
| 2003/0196135 A1 | 10/2003 | Gottlieb | |
| 2004/0022268 A1 | 2/2004 | Busi et al. | |
| 2004/0047286 A1* | 3/2004 | Larsen et al. | 370/216 |
| 2004/0101303 A1 | 5/2004 | Williams | |
| 2004/0165525 A1 | 8/2004 | Burak | |
| 2004/0202171 A1 | 10/2004 | Hama | |
| 2005/0135436 A1 | 6/2005 | Nigam et al. | |
| 2006/0059325 A1* | 3/2006 | Milne et al. | 711/200 |

OTHER PUBLICATIONS

Mamakos, et al., "A Method For Transmitting PPP Over Ethernet (Pppoe)," RFC 2516, Feb. 1999.

McPherson, et al., "VLAN Agreement for Efficient IP Address Allocation," RFC 3069, Feb. 2001.

Martini, et al., "Encapsulation Methods for Transport Of Ethernet Over MPLS Networks," RFC 4448, Apr. 2006.

Brayant, et al., "Pseudowire Emulation Edge-to-Edge (PWE3 Control Work For Use Over An MPLS PSN" RFC 4385, Feb. 2006.

U.S. Appl. No. 11/419,444.

Rosen et al., Request for Comments (RFC) 3032 of the Internet Engineering Task Force (IETF), "MPLS Label Stack Encoding," Jan. 2001.

Bradley, et al., in IETF RFC 1490, "Multiprotocol Interconnect over Frame Relay," Jul. 1993.

Baker, et al., in IETF RFC 1638, "PPP Bridging Control Protocal (BCP)," Jun. 1994.

Lasserre et al., in "Virtual Private LAN Services over MPLS" (IETF draft-lasserre-vkompella-ppvpn-vpls-02.txt, Jun. 2002 and Jan. 2003.

Awduche, et al., "Requirement for Traffic Engineering Over MPLS," published as IETF RFC 2702, Sep. 1999.

Deering, "RFC 1112, Host Extensions for IP Multicasting," Aug. 1989.

* cited by examiner

FAULT-TOLERANT MEDIUM ACCESS CONTROL (MAC) ADDRESS ASSIGNMENT IN NETWORK ELEMENTS

FIELD OF THE INVENTION

The present invention relates generally to communication networks, and particularly to methods and systems for assigning medium access control (MAC) addresses in network elements.

BACKGROUND OF THE INVENTION

Many methods are known in the art for providing fault tolerance and backup in communication networks. For example, U.S. Pat. No. 6,775,278, whose disclosure is incorporated herein by reference, describes a method for ensuring that a single and consistent reply is made to an address resolution protocol (ARP) request in a system of connected IP networks. When an adapter denoted A becomes active, the owning host sends an ARP advertisement into the network over the adapter. If the advertisement is also received at the sending host over a different adapter denoted B, the host knows that adapter B is on in the same physical network as adapter A. Adapter B can be designated as a backup adapter for A and A can be designated as a backup adapter for B.

If adapter A fails or becomes inactive, the host resets the backup adapter field for any adapter it owns for which A is marked as the backup adapter. If a backup adapter B has been designated for A, the host also sends an ARP advertisement associating the medium access control (MAC) address of adapter B (MAC-B) with the Internet Protocol (IP) address of adapter A (IP-A). This method allows network connections originally served via adapter A to continue to operate non-disruptively over adapter B, and also provides access to the host for subsequent new connections.

As another example, U.S. Pat. No. 6,760,859, whose disclosure is incorporated herein by reference, describes a method, program product, and apparatus for providing a non-disruptive takeover by a backup adapter when an adapter from a group of adapters connecting a data processing system to a local area network (LAN) fails. The adapters are arranged in one or more groups, with each group having at least two members, one member being a backup adapter in the idle state. Primitives, in accordance with the IEEE 802.2 standard, are monitored for each adapter. When a failure is detected, the medium access control (MAC) address for the failed adapter is loaded to the backup adapter, and the backup adapter is placed in the active state to non-disruptively take over the failed adapter.

SUMMARY OF THE INVENTION

There is therefore provided, in accordance with an embodiment of the present invention, a network element, including:

a backplane including a backplane memory holding first medium access control (MAC) address values;

multiple tributary modules, which are coupled to the backplane and which include network interfaces that are configured to communicate over network trunks using MAC addresses that are respectively assigned to the network interfaces; and a common function module (CFM), which is coupled to communicate with the tributary modules and the backplane memory via the backplane, and which includes a CFM memory holding second MAC address values, and which is arranged to assign the MAC addresses to the network interfaces by selecting the MAC addresses from among the first MAC address values when the CFM is able to access the backplane memory, and by selecting the MAC addresses from among the second MAC address values when the CFM is unable to access the backplane memory.

In some embodiments, the tributary modules include at least a first tributary module and a second tributary module, the first tributary module is configured to back-up the second tributary module, and the CFM is arranged to assign the MAC addresses used by the second tributary module to the first tributary module upon failure in the second tributary module.

In a disclosed embodiment, the CFM includes first and second CFMs, the first CFM is selected to serve as a primary CFM, and the second CFM is selected to serve as a secondary CFM and to replace the primary CFM upon failure in the primary CFM.

In another embodiment, each of the first and second CFMs is arranged to sense that only one of the first and second CFMs is able to access the backplane memory, and to select the one of the first and second CFMs able to access the backplane memory as the primary CFM.

In yet another embodiment, the primary CFM is arranged to update the secondary CFM with the MAC addresses selected to be assigned to the network interfaces and with previously-performed MAC address assignments, so as to enable the secondary CFM to replace the primary CFM upon failure in the primary CFM.

In some embodiments, the network element includes a handshake interface interconnecting the first and second CFMs, and each of the first and second CFMs is arranged to send over the handshake interface a message indicating whether it is able to access the backplane memory. In another embodiment, the backplane memory includes first and second memories, and the first and second CFMs are respectively arranged to access the first and second memories.

In still another embodiment, each of the first and second CFMs is arranged to generate a backplane failure alert responsively to determining that both of the first and second CFMs are unable to access the backplane memory. Additionally or alternatively, each of the first and second CFMs is arranged to generate a CFM failure alert responsively to determining that only one of the first and second CFMs is unable to access the backplane memory.

There is additionally provided, in accordance with an embodiment of the present invention, a method for address assignment in a network element, including:

storing first medium access control (MAC) address values in a backplane memory of a backplane of the network element;

storing second MAC address values in a CFM memory of a common function module (CFM) connected to the backplane;

using the CFM, selecting MAC addresses to be assigned to respective network interfaces of tributary modules in the network element from among the first values when the CFM is able to access the backplane memory and from among the second values when the CFM is unable to access the backplane memory;

assigning the selected MAC addresses to the network interfaces by communication between the CFM and the tributary modules via the backplane; and establishing communication via the network interfaces over network trunks using the assigned MAC addresses.

There is also provided, in accordance with an embodiment of the present invention, a computer software product for address assignment used in a common function module (CFM) of a network element, which includes a backplane including a backplane memory holding first MAC address values and multiple tributary modules connected to the backplane, wherein the CFM includes a CFM memory holding second MAC address values, the product including a computer-readable medium, in which program instructions are stored, which instructions, when read by a computer, cause the computer to assign MAC addresses to respective network interfaces in the tributary modules by communicating with the tributary modules via the backplane, to select the assigned MAC addresses from among the first values when the CFM is able to access the backplane memory and from among the second values when unable to access the backplane memory.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for assigning medium access control (MAC) addresses in network elements. In some embodiments, a network element comprises multiple tributary modules, which are interconnected by a backplane. Each tributary module comprises one or more network interfaces. MAC addresses are assigned flexibly to the network interfaces from a set of predetermined addresses. This flexible assignment enables, for example, a tributary module to replace another module in case of failure, while retaining the MAC addresses used by the failed module.

MAC addresses are assigned by a common function module (CFM). In some embodiments, the network element comprises two CFMs arranged in a protected configuration, with one module serving as a primary CFM and the other serving as a secondary CFM. Sets of MAC addresses to be assigned to the different network interfaces are stored in memory devices called inventories. One inventory is located in the backplane, and another inventory is located in each CFM. Typically but not necessarily, each inventory holds a different set of MAC addresses.

Under normal operating conditions, the CFM (or the primary CFM, when two CFMs are used) reads the MAC addresses stored in the backplane inventory and assigns these addresses to the different network interfaces of the network element. If the CFM is unable to access the backplane inventory, it uses the MAC addresses stored in its local inventory. In some embodiments, if only one of the CFMs installed in the network element is able to access the backplane inventory, this CFM is selected to be the primary CFM. Typically, the primary CFM updates the secondary CFM with the MAC addresses used and with the address assignments already performed. As a result, if the primary CFM fails and is replaced by the secondary CFM, the secondary CFM can continue to use the same MAC addresses and assignments.

The methods and systems described herein enable flexible and fault-tolerant MAC address assignment in the network element. When using these methods and systems, MAC addresses can continue to be assigned in the presence of CFM, backplane and tributary module failures. Protection switchovers of tributary modules and CFMs retain the currently-used MAC addresses and assignments.

Storing MAC addresses in the CFM inventories also reduces the likelihood of having to replace a faulty backplane. Unlike CFMs and tributary modules, which are usually field-replaceable, backplane replacement is more complicated, and sometimes causes a long service disruption.

The methods and systems described herein enable simple and constraint-free production and configuration processes. For example, the inventory of each CFM and backplane is typically pre-programmed during production with a unique set of MAC addresses, irrespective of other modules or of the particular network element in which the CFM or backplane is to be installed.

System Description

Figure 1:
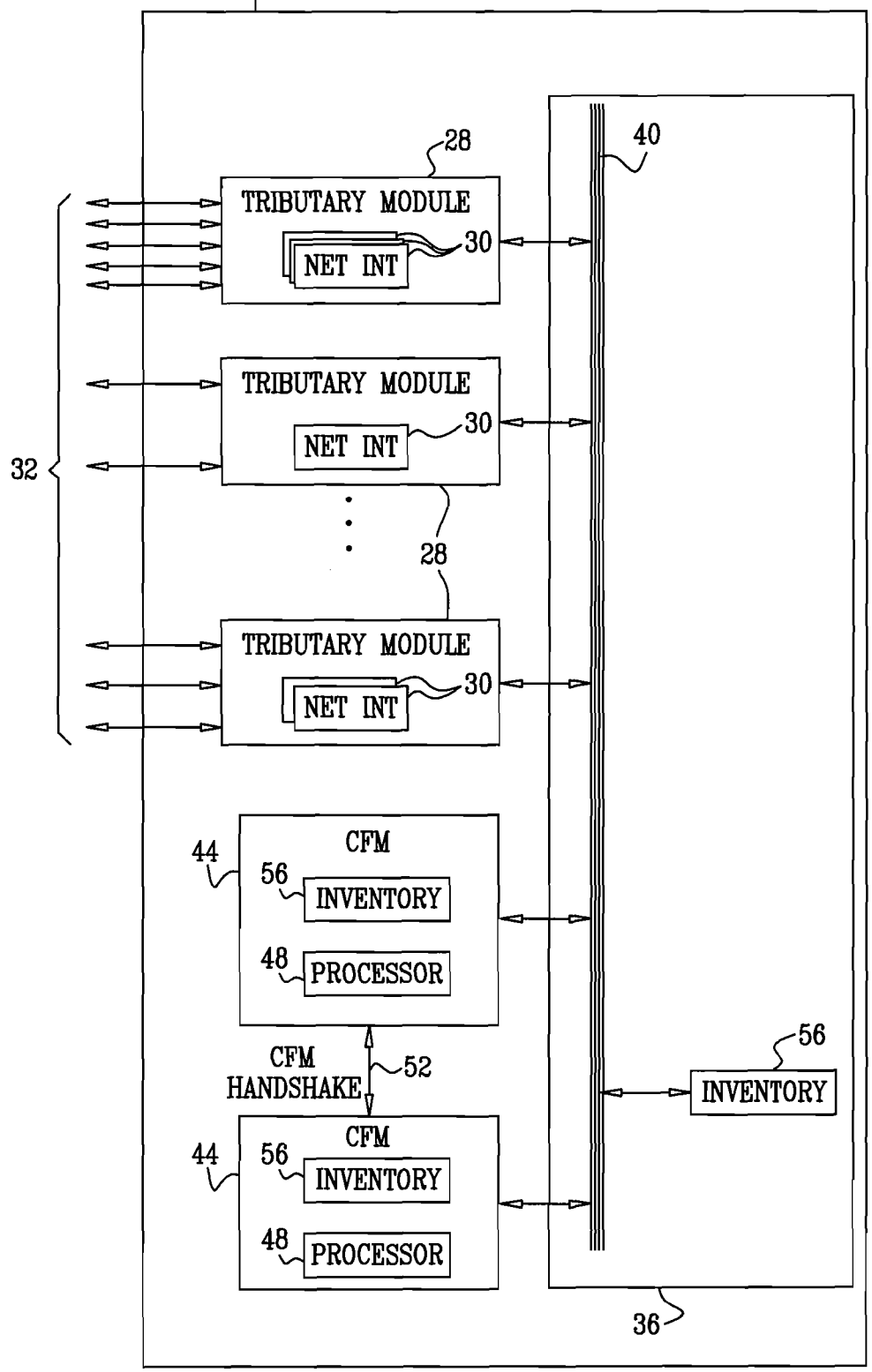
FIG. 1 is a block diagram that schematically illustrates a network element, in accordance with an embodiment of the present invention.

FIG. 1 is a block diagram that schematically illustrates a network element (NE) 20, in accordance with an embodiment of the present invention. NE 20 may comprise a switch, a router, a concentrator or any other element used in communication networks. NE 20 comprises a plurality of tributary modules 28, each serving one or more trunks 32. Tributary modules 28 may comprise, for example, time-division multiplexing (TDM) modules that provide voice and video services, Ethernet modules that provide data services, modules that provide resilient packet ring (RPR) interfaces, or any other suitable module. Tributary modules 28 are connected to a backplane 36, which comprises high-speed backplane traces 40 that interconnect the different modules. In some embodiments, NE 20 is packaged in a shelf unit and modules 28 connect to the backplane by plugging into slots of the shelf.

Each tributary module 28 comprises one or more network interfaces 30, which are used for communicating over trunks 32. Each network interface is identified by a unique MAC address. Typically, when a certain tributary module is plugged into the backplane, the network element assigns the appropriate MAC addresses to the module. In some embodiments, each network element 20 selects and assigns MAC addresses to the different tributary modules from a unique set of addresses. The description that follows assumes that the address set comprises a block of successive MAC addresses. In alternative embodiments, however, any other suitable address set can be used.

NE 20 is expected to provide a high level of reliability. The network element is often classified as carrier-class equipment, and as such it is designed with sufficient redundancy to avoid single points of failure. Additionally, the different modules in NE 20 are field-replaceable, and may be hot swapped in case of failure.

In some cases, some or all of modules 28 are configured in a protected configuration, in which a particular module 28 protects one or more of the other modules. When a certain protected module 28 fails, the backup module is automatically switched to replace it. As will be shown below, the methods and systems described herein enable switching from a failed tributary module to a backup module without changing the currently-used MAC address assignments.

Backplane 36 comprises an inventory 56, referred to as a backplane inventory. The backplane inventory comprises a suitable non-volatile memory device, which holds a definition of the set of MAC addresses to be assigned to the different network interfaces of NE 20. Inventory 56 may comprise, for example, a flash memory, an electrically erasable and programmable read only memory ($E^2PROM$), or any other suitable non-volatile memory device.

When the set of MAC addresses comprises a block of consecutive MAC addresses, the inventory may hold a more compact representation of the address set, such as a base address and a size of the block. In some embodiments, the inventory holds additional information, such as a serial number and a manufacturing date of the backplane. The information is typically written into the backplane inventory during backplane production.

The inventory can be dimensioned to have any suitable memory size, depending on the number of MAC addresses in the set, the way they are represented and the amount of additional information. For example, conventional non-volatile memory devices in the range of 64 to 2048 bytes can be used. A typical application may use, for example, a set of 512 successive MAC addresses stored in a 256-byte inventory.

In some embodiments, NE 20 comprises two common function modules (CFMs) 44. Each CFM comprises a management processor 48, which controls the different modules of the network element and handles network management requests. In particular, processor 48 assigns MAC addresses to the different network interfaces in tributary modules 28. CFMs 44 plug into backplane 36 and are typically field-replaceable. At any given time, one CFM 44 serves as the active or primary CFM. The other CFM serves as a secondary CFM that backs-up the primary CFM.

The CFMs communicate with modules 28 via backplane traces 40. The CFMs communicate with one another using a CFM handshake interface 52. Interface 52 typically comprises discrete signal lines that run on dedicated backplane traces on backplane 36, which are separate from backplane traces 40. In some embodiments, the CFMs are also interconnected using a Ethernet control bus (not shown in the figure), which is often duplicated for redundancy.

Although the embodiments described herein refer mainly to configurations comprising two CFMs, the methods and systems described herein can be used with any number of CFMs. In particular, the network element may operate with only a single CFM.

Typically, each processor 48 comprises a general-purpose processor, which is programmed in software to carry out the functions described herein. The software may be downloaded to the processor in electronic form, over a network, for example, or it may alternatively be supplied to the processor on tangible media, such as CD-ROM. Further alternatively, some elements of processor 48 may be implemented using hardware or using a combination of hardware and software elements.

In order to provide reliable MAC address assignment and avoid single points of failure, each of the two CFMs comprises an additional inventory, referred to as a CFM inventory. The CFM inventories typically comprise non-volatile memory devices similar to the backplane inventory. The CFM inventories hold MAC address blocks similar to the address block stored in the backplane inventory, although the address values and possibly the size of the address block in each of the three inventories may vary.

Under normal operating conditions (i.e., when no failures exist), the primary CFM reads the content of the backplane inventory to obtain the address block assigned to NE 20. The primary CFM then assigns MAC addresses from the address block read from the backplane inventory to the network interfaces of the network element. In some cases, however, the primary CFM is unable to read the address block from the backplane inventory because of failure in the CFM and/or in the backplane. In such cases, the primary CFM uses the address blocks stored in its local inventory, as will be described below.

The MAC address blocks and additional information is usually written into the CFM and backplane inventories during production. In many practical cases, CFMs and backplanes are manufactured and configured separately, and there is no prior knowledge as to which two CFMs and which backplane will be installed in a particular network element. Moreover, CFMs and/or backplanes may be replaced as a result of failures. CFMs, and to some extent backplanes, may be transferred from one network element to another. Thus, in order not to impose logistical constraints on the configuration of CFMs and backplanes, each backplane and CFM inventory is usually assigned a different, unique address block.

MAC Address Assignment Method

As noted above, one of CFMs 44 serves as the primary CFM and handles the assignment of MAC addresses. Under normal operating conditions, the primary CFM powers up, accesses the backplane inventory and uses the address block stored in the backplane inventory to assign MAC addresses to the various network interfaces in the network element. When the primary CFM is not able to read the content of the backplane inventory, various methods and policies can be used to perform MAC address assignment using the local CFM inventories of the two CFMs. An exemplary address assignment method is described in FIG. 2 below.

Figure 2:
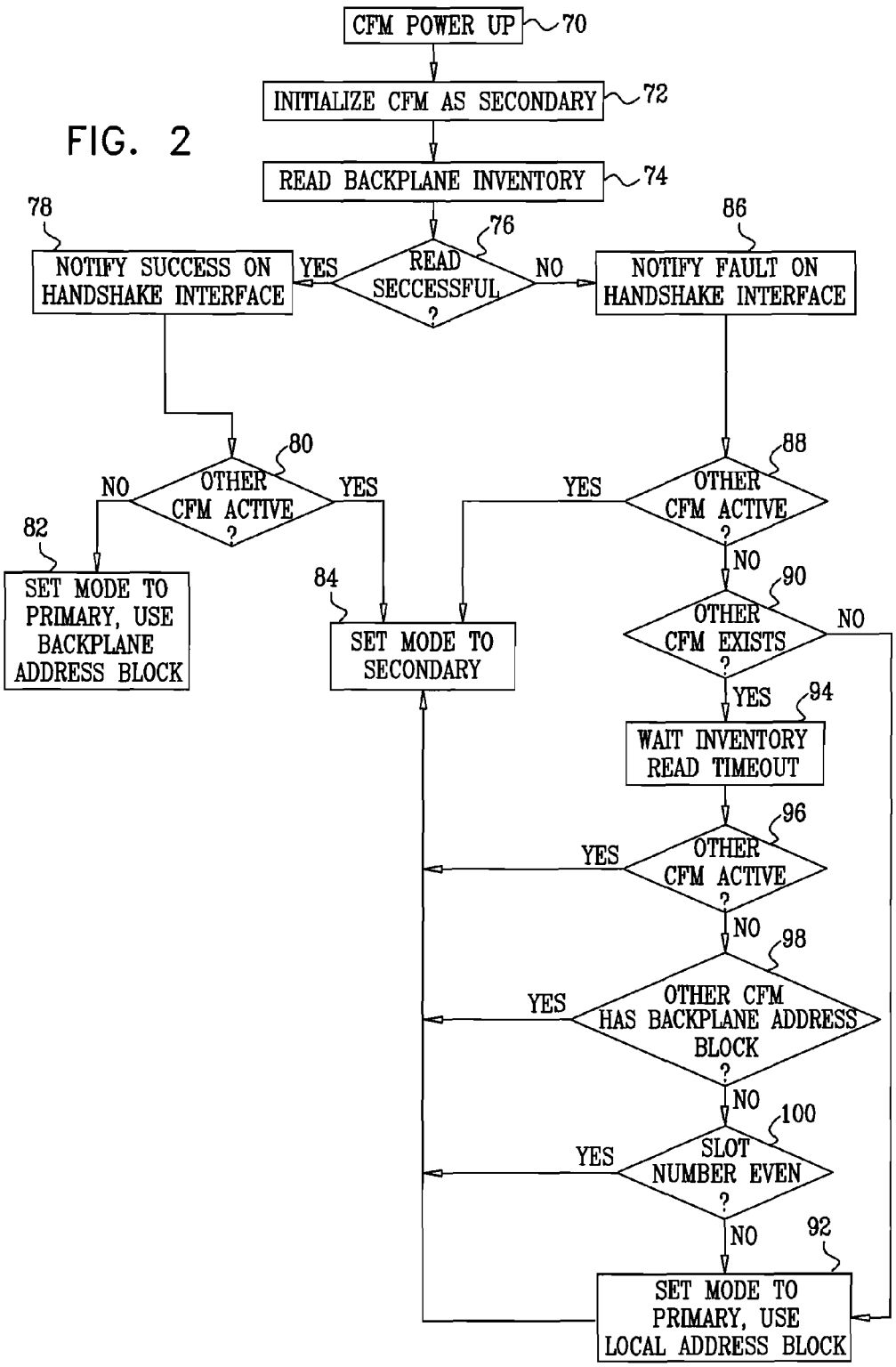
FIG. 2 is a flow chart that schematically illustrates a method for MAC address assignment, in accordance with an embodiment of the present invention.

FIG. 2 is a flow chart that schematically illustrates a method for MAC address assignment, in accordance with an embodiment of the present invention. The method describes the sequence of operations performed by a particular CFM. When two CFMs of a network element carry out the method of FIG. 2, their combined operation results in fault-tolerant MAC address assignment.

The method begins with the CFM powering-up, at a power-up step 70. The CFM is usually powered-up automatically when it is plugged into the appropriate slot of backplane 36. At this point, the newly powered-up CFM is not aware of the existence or status of its neighbor CFM in the network element. Thus, the CFM is initially set to operate as the secondary CFM, at an initial secondary setting step 72.

The CFM reads the content of the backplane inventory, at a backplane reading step 74, and checks whether the inventory content was read successfully, at a read checking step 76. If the backplane inventory content was read successfully, the CFM notifies the successful read on CFM handshake interface 52, at a success notification step 78. The CFM caches the content of the backplane inventory locally, for example in a free memory space in its local memory device. Typically, however, the CFM does not overwrite the content of its local CFM inventory.

The CFM checks whether the neighbor CFM is active (i.e., serves as primary), by communicating over interface 52, at a first neighbor checking step 80. If the neighbor CFM is not active, the CFM begins to operate as a primary CFM, at a first activation step 82. The CFM uses the address block read from the backplane inventory at step 74 above for performing MAC address assignments. In some embodiments, the CFM reports its primary role, for example by sending a message to a network management system and/or by providing a local indication, e.g., using a front panel light emitting diode (LED). If, on the other hand, the neighbor CFM is already active, the CFM begins to function as a secondary CFM, at a secondary operation step 84.

If the CFM is not able to successfully read the content of the backplane inventory, as concluded by read checking step 76 above, the CFM sends a failure notification over the CFM handshake interface, at a failure notification step 86. The CFM may also generate an appropriate alarm. The CFM then checks whether the neighbor CFM is active, at a second neighbor checking step 88. If the neighbor CFM is already active, the CFM reverts to secondary operation, at secondary operation step 84.

If the neighbor CFM is not found to be active, the CFM checks whether the neighbor CFM exists, i.e., plugged-in and powered-up, at a neighbor existence checking step 90. If the neighbor CFM does not exist, the CFM begins to operate as a primary CFM, at a second activation step 92. In this case, however, the CFM does not have access to the information stored in the backplane inventory. Therefore, the CFM uses the address block stored in its local CFM inventory for performing MAC address assignments.

If step 90 above concludes that the neighbor CFM exists but is not active, the CFM waits for a predetermined time-out interval, at a waiting step 94. Since some CFMs may be slower than others in waking up and/or reading the backplane inventory, the CFM gives the neighbor CFM an opportunity to complete its initialization process and become the primary CFM. The time out interval is typically defined based on the maximum time duration from wake-up until successful reading of the backplane inventory.

When the time out expires, the CFM checks again whether the neighbor CFM is active, at a third neighbor checking step 96. If the neighbor CFM is now active, the CFM sets itself to become the secondary CFM, at secondary operation step 84.

Otherwise, the CFM checks whether the neighbor CFM has successfully read the content of the backplane inventory, at a neighbor read checking step 98. If the neighbor CFM has successfully obtained the address block from the backplane inventory, the CFM lets the neighbor CFM become the primary CFM, and reverts to secondary operation at step 84 above.

If the neighbor CFM was not able to read the address block from the backplane inventory, the CFM concludes that both CFMs are now at the same status: both CFMs are powered up and potentially ready to become the primary CFM, but they both have no access to the backplane inventory. In such a case, the CFMs use a tie-breaker mechanism to determine which of the two is to become the primary CFM. In the present example, the backplane slots are numbered, the CFMs plug into successive slots, and the CFM plugged into the odd-numbered slot is arbitrarily chosen to become the primary CFM. Alternatively, any other suitable tie-breaking criterion can be used, such as criteria based on slot numbers, CFM serial numbers or any other parameter.

In the present example, the CFM checks whether the slot number it is plugged into is even, at a slot number checking step 100. If the slot number is even, the CFM reverts to secondary operation at step 84 above. Otherwise, the CFM sets itself to operate as the primary CFM, at second activation step 92. As noted above, in this case the CFM uses the address block stored in its local CFM inventory.

The method of FIG. 2 is an exemplary sequence of steps, which may be performed by the CFM. In alternative embodiments, any other suitable sequence of operations may be performed to ensure that one of the CFMs begins to operate as a primary CFM and the other operates as a secondary CFM. The primary CFM uses the MAC addresses stored in the backplane inventory, as long as it is able to read them. Otherwise, the primary CFM uses the addresses stored in its local inventory.

In some embodiments, once one of the CFMs begins to operate as the primary CFM, it mirrors the MAC address block used and the MAC address assignments already performed to the secondary CFM. If the primary CFM fails later and is replaced by the secondary CFM, the secondary CFM is able to continue using the same address block and retain the existing assignments. Mirroring of MAC addresses and prior assignments can be performed, for example, over the Ethernet control bus connecting the two CFMs.

Thus, the methods described herein enable seamless and fault-tolerant MAC address assignment in the network element. The MAC address assignment is agnostic to protection switchover among different tributary modules and between the two CFMs. Moreover, in the present example, once a particular address block is selected, whether from the backplane inventory or from a CFM inventory, the network element will continue to use this address block even though CFMs may be replaced over time.

In some embodiments, when failure is detected, the reading attempts performed by the two CFMs are used to isolate and determine the faulty module. For example, if both CFMs fail to access the backplane inventory, the backplane is assumed to be faulty. If only one of the CFMs fails to read the backplane inventory, this CFM is assumed faulty.

Failing to identify the faulty module correctly may sometimes cause duplicate MAC addresses. For example, assume a certain CFM has a faulty backplane interface, but it is not identified as faulty. When this CFM is the first CFM to be installed in a particular network element, it will assign MAC addresses from the address block of its local inventory. This address block will be retained when another CFM is installed. If the faulty CFM is removed and transferred to a second network element, it will again begin to use its locally stored MAC address block, which is the same as the address block used in the first network element. As a result of this sequence of events, two network elements will assign MAC addresses from the same address block. As a precaution, a CFM may be programmed with a new address block before it is installed in another network element, regardless of whether it is faulty or not.

The fault-tolerance of the network element can be further improved by using a dual backplane inventory. For example, in some embodiments the backplane may comprise two separate inventories using two separate data buses. Each CFM accesses a different backplane inventory. Typically but not necessarily, the two backplane inventories are programmed during production with the same address block.

Although the embodiments described herein mainly address MAC address assignment in network elements, the principles of the present invention can also be used for providing fault-tolerant configuration in any other scenario in which a network element should power up with certain configuration values. For example, network elements are sometimes managed using the well-known transaction language one (TL1) management protocol. In TL1, each network element is assigned a unique terminal identifier (TID). The methods and systems described herein can be used to provide fault-tolerant TID assignment. For example, a default TID value may be based on the serial number of the backplane. If this default value cannot be read by the CFMs, an alternative TID value stored in the primary CFM can be used instead.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network element, comprising:
a backplane comprising a backplane memory holding first medium access control (MAC) addresses;
multiple tributary modules, which are coupled to the backplane and which comprise network interfaces that are configured to communicate over network trunks using MAC addresses that are respectively assigned to the network interfaces; and
a common function module (CFM), which is coupled to communicate with the tributary modules and the backplane memory via the backplane, and which comprises a CFM memory holding second MAC addresses, and which is arranged to assign the MAC addresses to the network interfaces by selecting the MAC addresses from among the first MAC addresses when the CFM is able to access the backplane memory, and by selecting the MAC addresses from among the second MAC addresses when the CFM is unable to access the backplane memory.

2. The network element according to claim 1, wherein the tributary modules comprise at least a first tributary module and a second tributary module, wherein the first tributary module is configured to back-up the second tributary module, and wherein the CFM is arranged to assign the MAC addresses used by the second tributary module to the first tributary module upon failure in the second tributary module.

3. The network element according to claim 1, wherein the CFM comprises first and second CFMs, wherein the first CFM is selected to serve as a primary CFM, and wherein the second CFM is selected to serve as a secondary CFM and to replace the primary CFM upon failure in the primary CFM.

4. The network element according to claim 3, wherein each of the first and second CFMs is arranged to sense that only one of the first and second CFMs is able to access the backplane memory, and to select the one of the first and second CFMs able to access the backplane memory as the primary CFM.

5. The network element according to claim 3, wherein the primary CFM is arranged to update the secondary CFM with the MAC addresses selected to be assigned to the network interfaces and with previously-performed MAC address assignments, so as to enable the secondary CFM to replace the primary CFM upon failure in the primary CFM.

6. The network element according to claim 3, and comprising a handshake interface interconnecting the first and second CFMs, wherein each of the first and second CFMs is arranged to send over the handshake interface a message indicating whether it is able to access the backplane memory.

7. The network element according to claim 3, wherein the backplane memory comprises first and second memories, and wherein the first and second CFMs are respectively arranged to access the first and second memories.

8. The network element according to claim 3, wherein each of the first and second CFMs is arranged to generate a backplane failure alert responsively to determining that both of the first and second CFMs are unable to access the backplane memory.

9. The network element according to claim 3, wherein each of the first and second CFMs is arranged to generate a CFM failure alert responsively to determining that only one of the first and second CFMs is unable to access the backplane memory.

10. A method for address assignment in a network element, comprising:

storing first medium access control (MAC) addresses in a back plane memory of a backplane of the network element;
storing second MAC addresses in a CFM memory of a common function module (CFM) connected to the backplane;
using the CFM, selecting MAC addresses to be assigned to respective network interfaces of tributary modules in the network element from among the first MAC addresses when the CFM is able to access the backplane memory and from among the second MAC addresses when the CFM is unable to access the backplane memory;
assigning the selected MAC addresses to the network interfaces by communication between the CFM and the tributary modules via the backplane; and
establishing communication via the network interfaces over network trunks using the assigned MAC addresses.

11. The method according to claim 10, wherein the tributary modules comprise at least a first tributary module and a second tributary module, wherein the first tributary module is configured to back-up the second tributary module, and wherein assigning the selected MAC addresses comprises assigning the MAC addresses used by the second tributary module to the first tributary module upon failure in the second tributary module.

12. The method according to claim 10, wherein the CFM comprises first and second CFMS, and comprising selecting the first CFM to serve as a primary CFM, selecting the second CFM to serve as a secondary CFM and replacing the primary CFM with the secondary CFM upon failure in the primary CFM.

13. The method according to claim 12, wherein selecting the first CFM to serve as the primary CFM comprises selecting the first CFM responsively to sensing that only the first CFM is able to access the backplane memory.

14. The method according to claim 12, and comprising updating the secondary CFM by the primary CFM with the MAC addresses selected to be assigned to the network interfaces and with previously-performed MAC address assignments, so as to enable the secondary CFM to replace the primary CFM upon failure in the primary CFM.

15. The method according to claim 12, and comprising interconnecting the first and second CFMs by a handshake interface, and sending over the handshake interface messages indicating whether each of the first and second CFMs is able to access the backplane memory.

16. The method according to claim 12, wherein storing the first MAC address comprises storing separate value sets in first and second memories in the backplane, and respectively accessing the first and second memories by the first and second CFMs.

17. The method according to claim 12, and comprising generating a backplane failure alert responsively to determining that both of the first and second CFMs are unable to access the backplane memory.

18. The method according to claim 12, and comprising generating a CFM failure alert responsively to determining that only one of the first and second CFMs is unable to access the backplane memory.

19. A computer software product for address assignment used in a common function module (CFM) of a network element, which includes a backplane including a backplane memory holding first MAC addresses and multiple tributary modules connected to the backplane, wherein the CFM includes a CFM memory holding second MAC addresses, the product comprising a computer-readable medium, in which program instructions are stored, which instructions, when read by a computer, cause the computer to assign MAC addresses to respective network interfaces in the tributary modules by communicating with the tributary modules via the backplane, to select the assigned MAC addresses from among the first MAC addresses when the CFM is able to access the backplane memory and from among the second MAC addresses when unable to access the backplane memory.

* * * * *